US008646785B2

(12) United States Patent
Udall et al.

(10) Patent No.: US 8,646,785 B2
(45) Date of Patent: Feb. 11, 2014

(54) MOBILE STORAGE UNIT

(75) Inventors: Laura Elizabeth Udall, San Jose, CA (US); Nicholas V. Udall, San Jose, CA (US)

(73) Assignee: Zuca, Inc., Campbell, CA (US)

(*) Notice: Subject to any disclaimer, the term of this patent is extended or adjusted under 35 U.S.C. 154(b) by 0 days.

(21) Appl. No.: 13/463,506

(22) Filed: May 3, 2012

(65) Prior Publication Data

US 2012/0218144 A1 Aug. 30, 2012

Related U.S. Application Data

(63) Continuation of application No. 11/409,327, filed on Apr. 20, 2006, now Pat. No. 8,191,908, which is a continuation-in-part of application No. 10/123,753, filed on Apr. 17, 2002, now Pat. No. 7,207,577.

(60) Provisional application No. 60/673,554, filed on Apr. 20, 2005.

(51) Int. Cl.
*B62B 1/16* (2006.01)
(52) U.S. Cl.
USPC ...................... 280/47.26; 280/47.25; 280/655
(58) Field of Classification Search
USPC ........ 280/655, 652, 655.1, 568.1, 572.1, 651,
280/639, 32.6, 47.25, 20, 87.05, 47.21,
280/47.27, 47.18, 47.131, 47.16, 47.17,
280/47.2, 47.24, 47.26, 47.315; 190/18,
190/123, 127, 122, 107
See application file for complete search history.

(56) References Cited

U.S. PATENT DOCUMENTS

| 2,472,491 | A |   | 6/1949  | Quinton              |         |
|-----------|---|---|---------|----------------------|---------|
| 2,842,373 | A |   | 7/1958  | Duerr                |         |
| 3,677,571 | A |   | 7/1972  | Maturo, Jr. et al.   |         |
| 3,684,307 | A |   | 8/1972  | Bourgraf et al.      |         |
| 3,994,372 | A | * | 11/1976 | Geller et al. ........ | 190/107 |
| 3,997,213 | A |   | 12/1976 | Smith et al.         |         |
| 4,355,818 | A |   | 10/1982 | Watts                |         |
| 4,460,188 | A |   | 7/1984  | Maloof               |         |
| 4,813,520 | A | * | 3/1989  | Lin .................. | 190/107 |
| 4,846,486 | A | * | 7/1989  | Hobson ............. | 280/47.25 |
| 4,886,286 | A |   | 12/1989 | Whorton, III         |         |
| 5,118,130 | A |   | 6/1992  | Kaltz                |         |
| 5,120,072 | A | * | 6/1992  | Laramie ........... | 280/47.17 |
| 5,265,892 | A |   | 11/1993 | Said                 |         |
| 5,364,120 | A |   | 11/1994 | Shimansky            |         |
| 5,374,073 | A |   | 12/1994 | Hung-Hsin            |         |
| 5,445,398 | A |   | 8/1995  | Pierce               |         |

(Continued)

FOREIGN PATENT DOCUMENTS

DE 4221215 A1 * 1/1994 ............... A45C 5/14
JP 2002177035 A 6/2002
WO 2007149579 A2 12/2007

*Primary Examiner* — John Walters
(74) *Attorney, Agent, or Firm* — Haverstock & Owens LLP

(57) ABSTRACT

A mobile storage unit is disclosed. The mobile storage unit includes a rigid exo-skeletal frame and a flexible storage bag that couples to the rigid exo-skeletal frame while within an open storage region framed by the exo-skeletal frame. The mobile storage unit also includes a top seat portion and stabilizing features that extend and retract from the rigid exo-skeletal frame to support the mobile storage unit in the upright position. The mobile storage unit can also include a monitoring device for transmitting signals that are used to determine the location of the mobile storage unit.

22 Claims, 6 Drawing Sheets

(56) References Cited

U.S. PATENT DOCUMENTS

| | | |
|---|---|---|
| 5,660,296 A | 8/1997 | Greenwich |
| 5,762,170 A | 6/1998 | Shyr et al. |
| 5,836,601 A | 11/1998 | Nelson |
| 5,863,055 A | 1/1999 | Kasravi et al. |
| 5,887,878 A | 3/1999 | Tisbo et al. |
| D410,784 S | 6/1999 | Sandford et al. |
| 5,967,544 A | 10/1999 | Kanta |
| 5,988,657 A | 11/1999 | Henkel |
| 6,024,194 A | 2/2000 | Chung-Hsien |
| 6,086,073 A | 7/2000 | Tisbo et al. |
| 6,196,560 B1 | 3/2001 | Ohlsson |
| 6,357,567 B1 * | 3/2002 | Tsai .................... 190/18 A |
| 6,362,736 B1 * | 3/2002 | Gehlot .................... 340/568.1 |
| 6,382,736 B1 | 5/2002 | Chang |
| 6,550,860 B2 | 4/2003 | Lombardi |
| 6,598,898 B2 | 7/2003 | Chu |
| 6,729,630 B2 * | 5/2004 | Szmidt et al. .............. 280/47.25 |
| 6,769,701 B1 | 8/2004 | Clausen |
| 6,805,225 B2 | 10/2004 | Freedman |
| 6,814,361 B2 | 11/2004 | Tsu |
| 6,929,275 B1 | 8/2005 | Schlangen |
| 6,964,420 B1 | 11/2005 | Ghanizadeh et al. |
| 7,066,311 B2 | 6/2006 | O'Shea |
| 7,151,454 B2 * | 12/2006 | Washington .............. 340/572.1 |
| 7,168,713 B2 * | 1/2007 | Udall et al. ................. 280/47.26 |
| 7,207,577 B2 * | 4/2007 | Udall et al. ................. 280/47.26 |
| 7,798,499 B2 | 9/2010 | Gregory |
| 8,172,241 B2 | 5/2012 | Salvucci, Jr. |
| 8,191,908 B2 | 6/2012 | Udall et al. |
| 8,317,205 B2 | 11/2012 | Udall et al. |
| 2002/0105156 A1 | 8/2002 | Glidden |
| 2002/0195782 A1 | 12/2002 | Cates et al. |
| 2003/0015858 A1 | 1/2003 | Chu |
| 2003/0197340 A1 | 10/2003 | Udall et al. |
| 2004/0032102 A1 | 2/2004 | Safari et al. |
| 2005/0051981 A1 | 3/2005 | Wallace et al. |
| 2006/0087432 A1 * | 4/2006 | Corbett, Jr. ................ 340/572.1 |
| 2007/0120336 A1 | 5/2007 | Udall et al. |
| 2007/0235964 A1 | 10/2007 | Gregory |

\* cited by examiner

MOBILE STORAGE UNIT

RELATED APPLICATION(S)

This application is a Continuation Application of U.S. patent application Ser. No. 11/409,327, filed on Apr. 20, 2006 and entitled "MOBILE STORAGE UNIT", which is a Continuation-in-part of the application Ser. No. 10/123,753, filed Apr. 17, 2002, and titled "A MOBILE STORAGE UNIT." This Patent Application also claims priority under 35 U.S.C. 119 (e) of the co-pending U.S. Provisional Patent Application Ser. No. 60/673,554, filed Apr. 20, 2005, and titled "PORTABLE STORAGE UNIT AND METHODS." The U.S. patent application Ser. No. 11/409,327, filed Apr. 20, 2006, and entitled "MOBILE STORAGE UNIT", U.S. patent application Ser. No. 10/123,753, filed Apr. 17, 2002, and titled "A MOBILE STORAGE UNIT," and the U.S. Provisional Patent Application Ser. No. 60/673,554, filed Apr. 20, 2005, and titled "PORTABLE STORAGE UNIT AND METHODS," are all hereby incorporated by reference.

FIELD OF THE INVENTION

The present invention relates to portable luggage and storage units. More particularly, the present invention relates to a mobile storage unit with an exo-skeletal frame.

BACKGROUND

There are a number of different types of backpacks, totes, duffle bags and luggage units that are used for porting articles from place to place. These prior art portable storage units suffer from a number of shortcomings. For example, once the casing of the portable storage unit is worn out or rips, the entire unit typically needs to be replaced. Also, most soft shell or fabric-type storage units used for travel are structurally flimsy and will collapse, deform or break when placed under a load. Accordingly, such prior art portable storage units can not be stacked or sat upon.

There are also hard shell or solid shell portable storage units. However, like the soft shell portable storage units, they are unusable once the shell is punctured or cracked. Also, the hard shell is typically thin in order to minimize the weight of the portable storage and is, therefore, can collapse when placed under heavy weight. A further shortcoming of a hard shell portable storage unit is that there is no easy way to make a hard shell unit with pockets or other compartments that can be readily accessed from outside the hard shell without opening the main storage compartment formed by the hard shell.

Accordingly there is a need to make a lightweight mobile storage units that are structurally sound, such that they can withstand weight caused by stacking units together and/or sitting on them, without collapsing. Preferably, the mobile storage units have storage compartments that can be replaced in the event of a tear, puncture or other damage. Also, the mobile storage units preferably include outside pockets or other compartments that can be accessed without having to open the main storage compartments of the mobile storage units.

SUMMARY OF THE INVENTION

The present invention is directed to a mobile storage unit and mobile storage unit system. In accordance with the embodiments of the invention, a mobile storage unit includes a rigid exo-skeletal frame that is preferably substantially rectangular and sized to fit into an overhead compartment of an airplane. The rigid exo-skeletal frame is preferably made from tubes that are secured together through bracket or plate features. The tubes and bracket or plate features can be made from any suitable material or combination of materials including, but not limited to, plastic, metal, carbon and polycarbonate. The rigid exo-skeletal frame forms an open storage region, with a plurality of open faces or sides, that is configured to hold a storage container.

Preferably, the storage container is a flexible storage bag with a main storage compartment. The flexible storage bag is preferably formed of a woven fabric or any other flexible material or combination of materials. The flexible storage bag fits into the open storage region of the rigid exo-skeletal frame and couples to the rigid exo-skeletal frame while positioned within the open storage region. The flexible storage bag can be permanently coupled to the rigid exo-skeletal frame or alternatively the flexible storage bag can be detachably coupled to the rigid exo-skeletal frame by any suitable means known in the art including, but not limited to, hook-loop fabric fasteners, snaps, clips, buckles and wrap features. Preferably, the flexible storage bag detachably couples to the rigid exo-skeletal frame and can, therefore, be replaced with a new flexible storage bag when it becomes worn out or damaged. The flexible storage bag preferably includes a plurality of outer pocket features or compartments that are accessible from outside of the main storage compartment of the flexible storage bag and through open portions of the rigid exo-skeletal frame. For example, the rigid exo-skeletal frame can have an open section and open side sections through which matched pocket features or compartments on the flexible storage bag can be accessed.

In accordance with the preferred embodiment of the invention, a mobile storage unit includes a top seat portion configured be at upon while the mobile storage unit is in an upright position. To allow the mobile storage unit to fit into an overhead compartment of an airplane, the depth (the dimension from front to back) of the back is less than the width (the dimension from side to side) of the mobile storage unit an could be unstable when sat upon. Accordingly, the mobile storage unit of the present invention preferably includes stabilizing features. The stabilizing features are, for example, retractable kick stand features that extend and retract from the rigid exo-skeletal frame to support the mobile storage unit in the upright position.

In accordance with a preferred embodiment of the invention, the mobile storage unit includes wheels and an expandable or telescoping handle for rolling the mobile storage unit while the mobile storage is in a tilted position. In accordance with this embodiment, the stabilizing features are retractable kick stand features that extend and retract from wheel wells positioned over the wheels.

In accordance with still further embodiments of the invention, a mobile storage unit includes a monitoring device coupled to the mobile storage unit for transmitting location signals. The monitoring device can include a GPS (global position system) unit and cellular phone or a combination thereof for transmitting radio location signals.

A mobile storage system in accordance with the embodiments of the invention includes a receiving station, a computer and software configured to receive radio location signals for mobile storage units equipped with monitoring devices for remotely identify the geographical location of the mobile storage units.

DETAILED DESCRIPTION

Figure 1A:
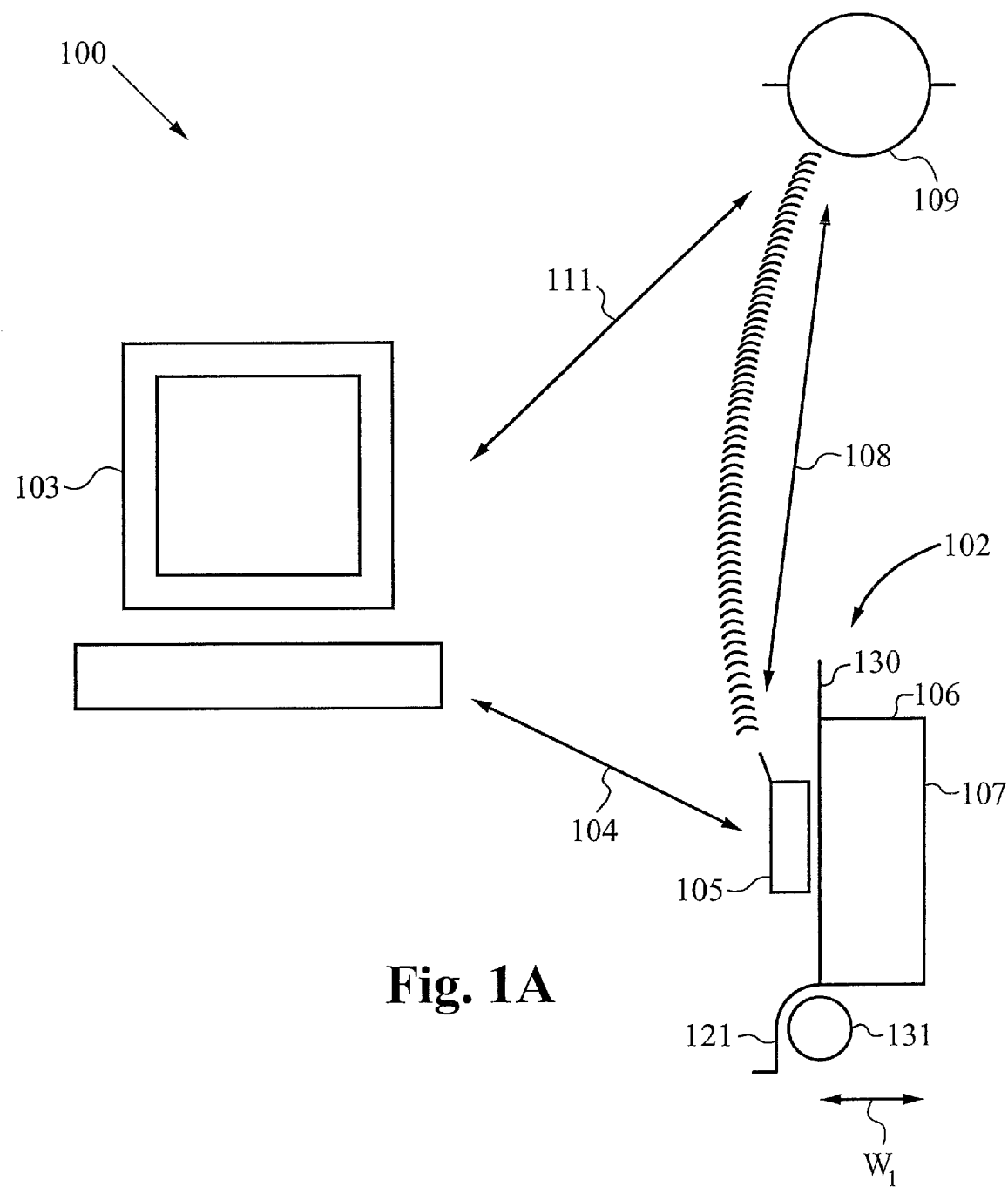
FIG. 1A shows a schematic representation of mobile storage system with tracking capabilities, in accordance with the embodiments of the invention.

Referring to FIG. 1A, a system 100 includes one or more mobile storage units 102. An exemplary mobile storage unit 102 includes a monitoring or tracking device 105 for coupling to mobile storage unit 102 and is configured for sending location signals to a GPS satellite 109 and for receiving and processing location signals from the satellite 109, as indicated by the arrow 108. The location signals can be used for remotely identify the geographical location of the mobile storage unit 102.

The monitoring or tracking device 105 is preferably 2⅝" 4¼"×1" in size or smaller, and is self-contained within a box that houses the electronics for a GPS unit, a motion detector and/or a cell phone, as explained below. The monitoring or tracking device 105 can be fastened inside an aluminum enclosure (not shown) of the mobile storage unit 102, such that the monitoring or tracking device 105 can not be easily removed. The monitoring or tracking device 105 also preferably includes a rechargeable battery (not shown) that provides the necessary power for the monitoring or tracking device 105 to send or broadcast tracking signals and/or location signals.

In addition to the GPS capabilities, the monitoring or tracking device 105 can include a cellular phone that transmits the geographical location of the mobile storage unit 102 to a remote server 103, as indicated by the arrow 104. The remote server 103 can be remotely accessed using a personal cell phone or personal computer (not shown) and the location of the mobile storage unit 102 can be graphically displayed using a graphical user interface. Alternatively, a user can remotely call the monitoring or tracking device 105 with the personal cell phone or personal computer and the monitoring or tracking device 105 then communicates the location of the mobile storage unit 102 to the personal cellular phone or personal computer and the location can be graphically displayed.

In an alternative embodiment of the invention, the remote server 103 can be configured to receive location information about the mobile storage unit 102 directly from the satellite 109, as indicated by the arrow 111.

Figure 1B:
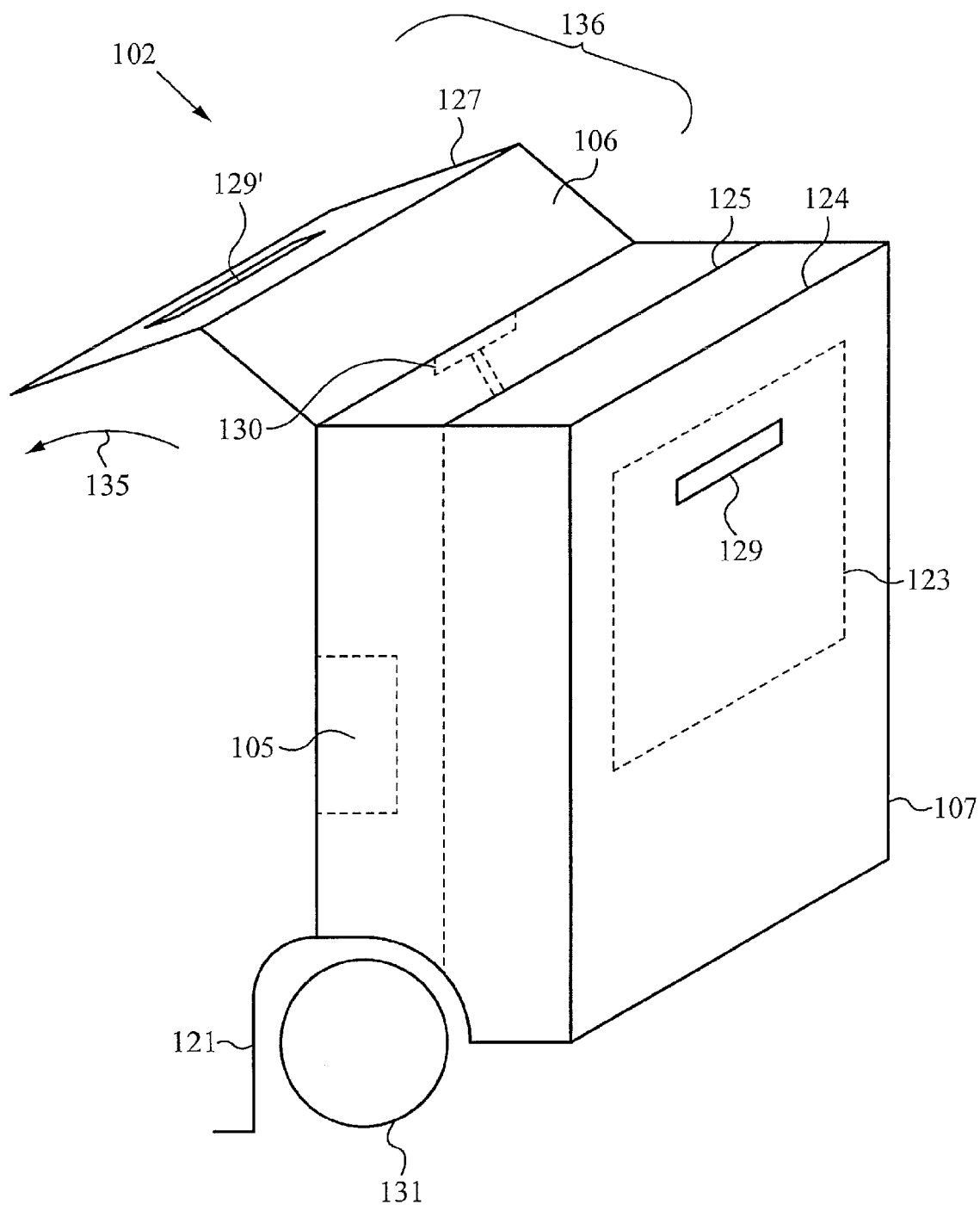
FIG. 1B illustrates a mobile storage unit with a monitoring device and a stabilizing feature, in accordance with further embodiments of the invention.
Figure 2A:
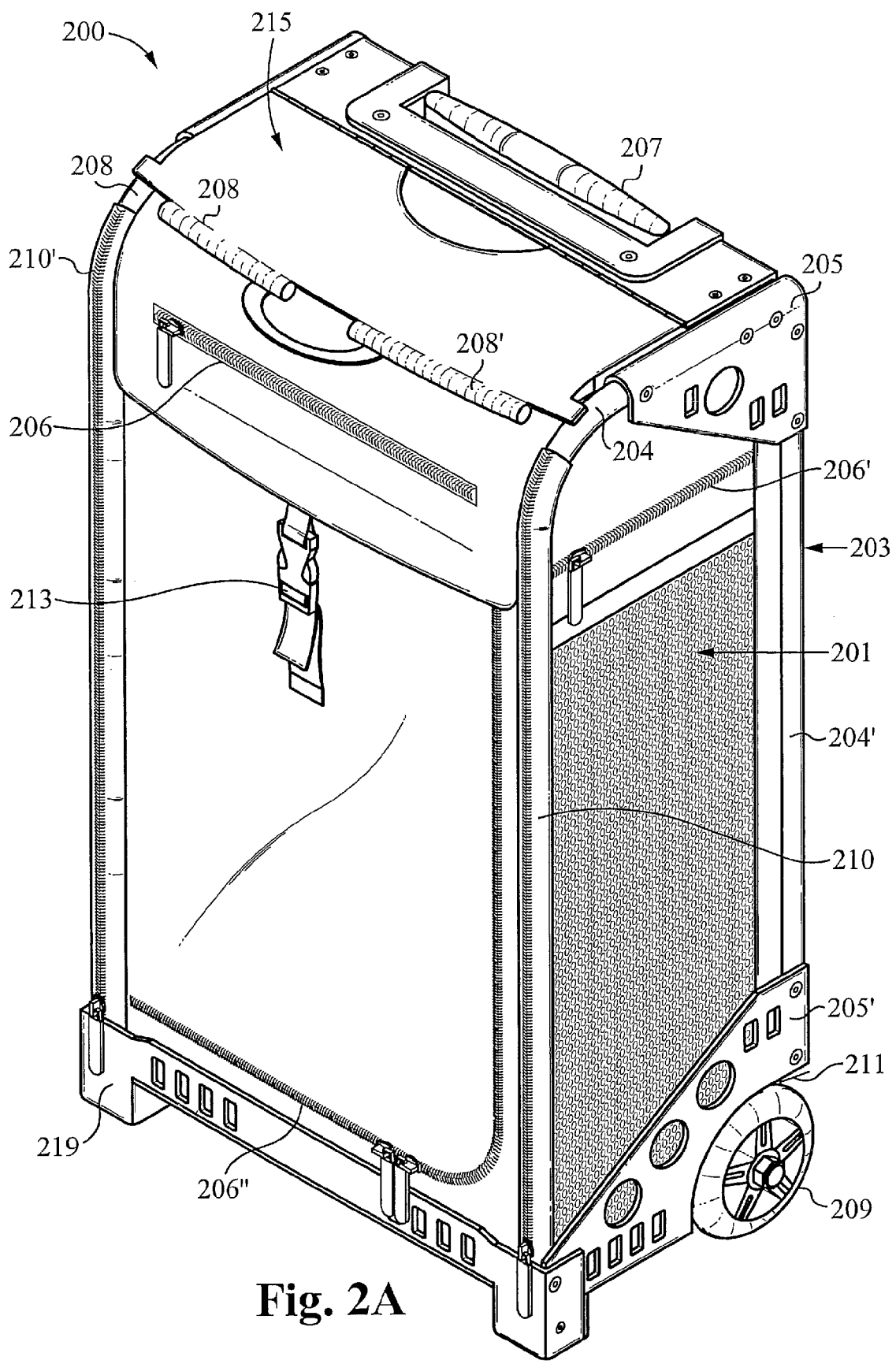
FIGS. 2A-D show a mobile storage unit, in accordance a preferred embodiment of the invention.
Figure 2B:
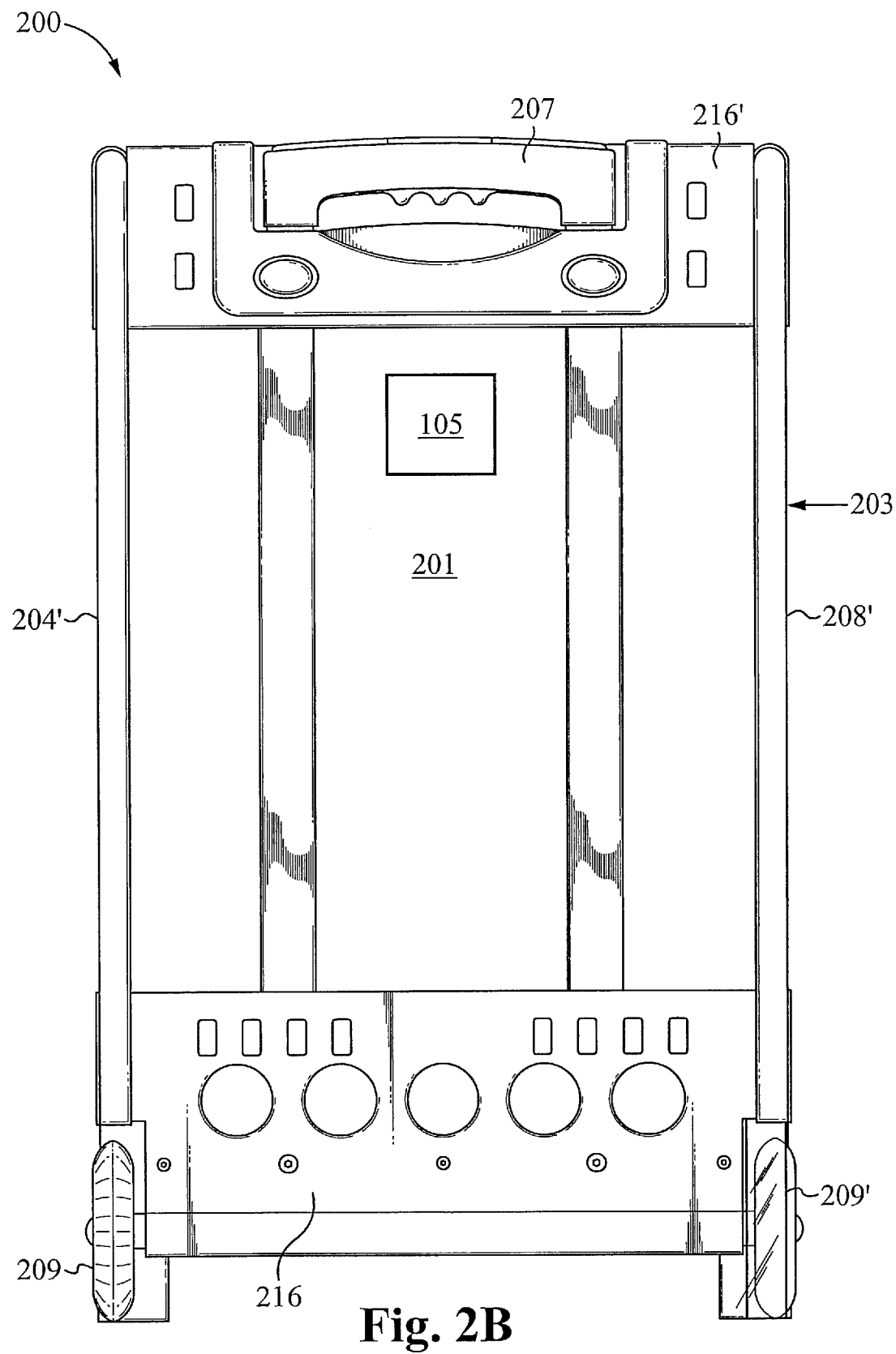
Figure 2C:
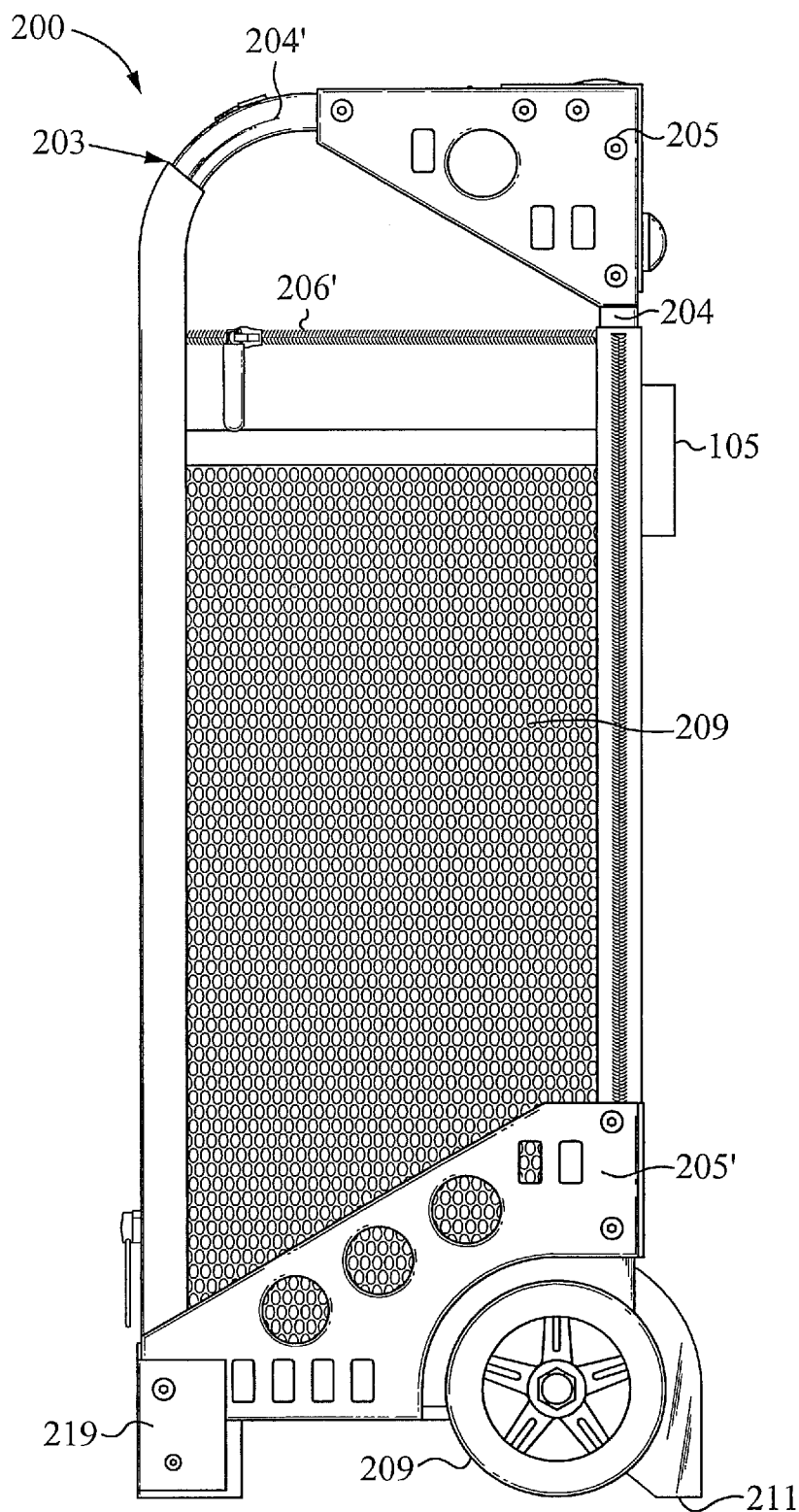
Figure 2D:
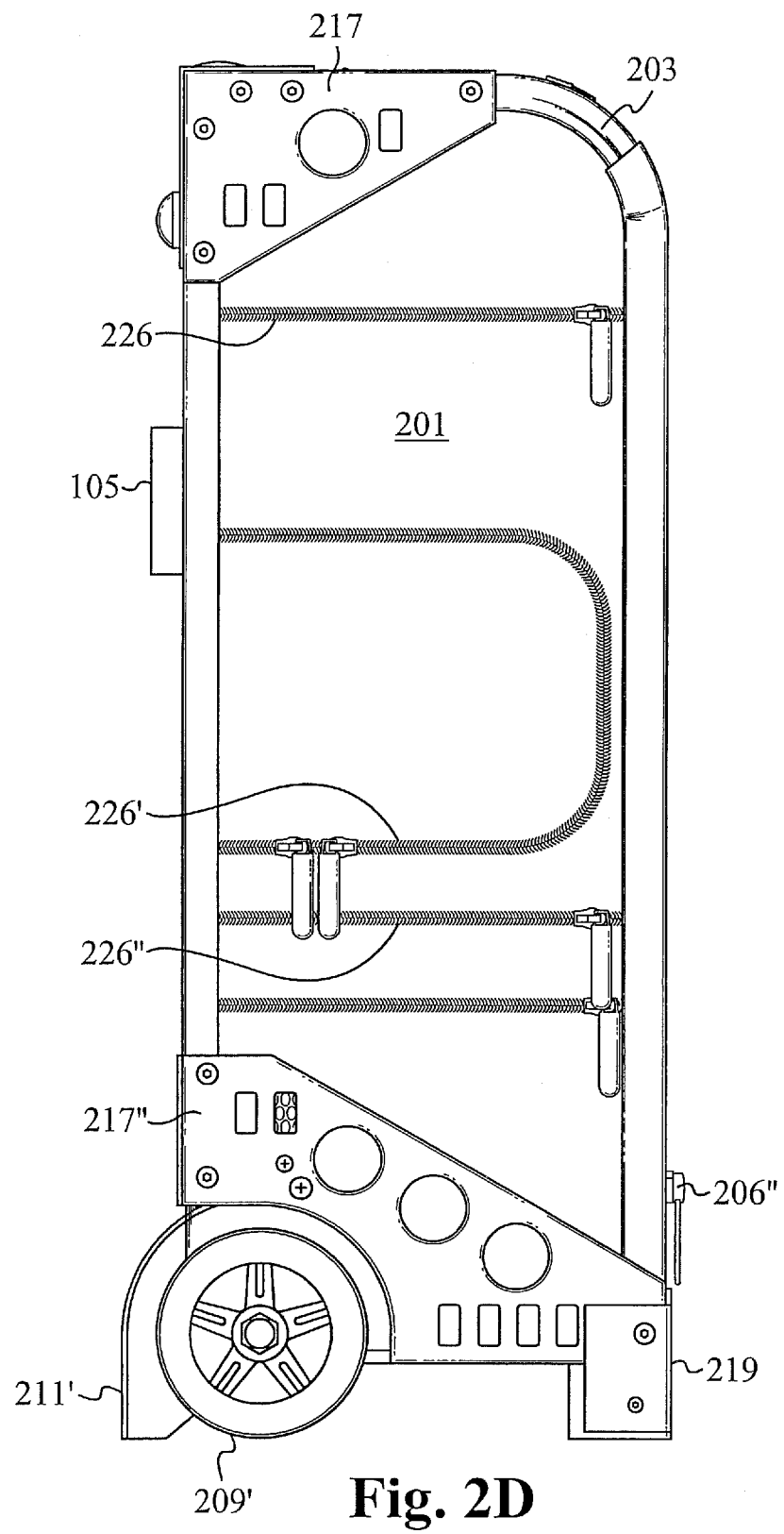

Referring now to FIG. 1B, the mobile storage unit 102 in accordance with the embodiments of the invention includes a storage portion 107 formed from a rigid frame and flexible storage bag coupled to the rigid frame structure, such as described in detail below with reference to FIGS. 2A-D. The mobile storage unit 102 also includes wheels 131 and a retractable handle 130 coupled at or near a base portion of the rigid frame structure for rolling the mobile storage unit 102 while tilting the mobile storage unit 102 backwards as indicated by the arrow 135. The mobile storage unit 102 also preferably includes one or more retractable support structures, stabilizing features or kick stand features 121 for providing support to the mobile storage unit 102 with the storage unit in the up-right position.

The lid of the mobile storage unit 102 preferably comprises a top seat portion 136. The top seat portion 136 can be formed from hinged sections 106 and 127. The top seat portion 136 can be used as a seat for sitting when the top seat portion 136 is in a closed position. The storage portion 107 and the seat portion 136 preferably include complementary locking features 129 and 129' for holding the seat portion 136 in the closed position. The hinged section 106 can include pocket or storage features for holding office supplies and the like. Preferably the storage portion 107 includes a divider 125 for dividing the main storage compartment 124. The main storage compartment 124 is preferably equipped with a pocket feature 123 sized for holding a lap-top computer (not shown) within the main storage compartment 124.

Referring now to FIGS. 2A-D a mobile storage unit 200 in accordance with the embodiments of the invention includes a rigid exo-skeletal frame 203 that is preferably substantially rectangular as shown. The rigid exo-skeletal frame 203 is preferably made from tubes 204, 204', 208 and 208' that are secured together through bracket or plate features 205, 205', 216, 216', 217, 217' and 219. The tubes 204, 204', 208 and 208' and bracket or plate features 205, 205', 216, 217, 217' and 219 can be made form any suitable material or combination of materials. The rigid exo-skeletal frame 203 fauns an open storage region, with a plurality of open faces or sides, that is configured to hold a storage container 201.

Preferably, the storage container 201 is a flexible storage bag with a main storage compartment. The flexible storage bag 201 is preferably formed from woven fabric or any other flexible material or combination of materials. The flexible storage bag 201 fits into the open storage region of the rigid exo-skeletal frame 203, coupled to the rigid exo-skeletal frame 203 while positioned within the open storage region. The flexible storage bag 201 couples to the rigid exo-skeletal frame 203 through sleeves 210 and 210' and can be decoupled from the rigid exo-skeletal frame 203 by disassembling the rigid exo-skeletal frame 203. Alternatively, the flexible storage bag 201 couples to the rigid exo-skeletal frame 203 through hook-loop fabric fasteners, snaps, clips, buckles, wrap features and any combination thereof. The flexible storage bag 201 preferably includes plurality of outer pocket features or compartments 206, 206' 206", 226, 226' and 226" that are accessible from outside of the main storage compartment of the flexible storage bag 201 and through open front and side portions of the rigid exo-skeletal frame 203. The pocket features or compartments 206, 206' 206", 226 and 226' can include zippers, as shown, flaps, snaps or any other suitable features for closing and opening the he pocket features or compartments 206, 206' 206", 226, 226' and 226".

In accordance with the preferred embodiment of the invention, a mobile storage unit 200 includes a top seat portion 215 with hinges 208 and 208' configured to sit on while the mobile storage unit 200 is in an upright position, as shown. The mobile storage unit 200 preferably includes wheels 209 and 209' and an extendable handle 207 for rolling the mobile storage unit 200 while the mobile storage is in a tilted position, such as described above. The mobile storage unit 200 also preferably includes stabilizing features that extend and retract from wheel wells positioned over the wheels 209 and 209' to support the mobile storage unit in the upright position. The mobile storage unit 200 further includes a lock feature 213 for holding the top seat portion 215 in the closed position, as shown. Also, the mobile storage unit 200 preferably includes a monitoring or tracking device 105 for tracking the location of the mobile storage unit 200, such as described above with reference to FIG. 1A.

Although the present invention has been described in accordance with the embodiments shown, one of ordinary skill in the art will readily recognize that there could be variations to the embodiments and those variations would be within the spirit and scope of the present invention. Specifically, the exo-skeletal frame can be made to controllably collapse, fold or be readily disassembled for easy storage.

Accordingly, many modifications may be made by one of ordinary skill in the art without departing from the spirit and scope of the invention as defined by the appended claims.

What is claimed is:

1. A mobile storage unit comprising:
   a) a rigid exo-skeletal frame made from tubes and brackets, wherein the rigid exo-skeletal frame forms an open storage region;
   b) a flexible storage bag with a main storage compartment and that couples to the rigid exo-skeletal frame while positioned within the open storage region; and
   c) a top seat portion having a front side and a back side and configured to sit on while the mobile storage unit is in an upright position, wherein the top seat portion is supported by the rigid exo-skeletal frame at the front side and the back side.

2. The mobile storage unit of claim 1, further comprising wheels and an extendable handle for rolling the mobile storage unit while the mobile storage is in a tilted position.

3. The mobile storage unit of claim 2, further comprising means for stabilizing the mobile storage unit in the upright position.

4. The mobile storage unit of claim 3, wherein the means for stabilizing the mobile storage unit in the upright position includes retractable kick stand features that extend and retract from wheel wells positioned over the wheels.

5. The mobile storage unit of claim 1, wherein the flexible storage bag detachably couples to the rigid exo-skeletal frame.

6. The mobile storage unit of claim 1, wherein the flexible storage bag includes a plurality of pocket features that are accessible outside of the main storage compartment of the flexible storage bag and through open portions of the rigid exo-skeletal frame.

7. The mobile storage unit of claim 1, further comprising a monitoring device coupled transmitting location signals.

8. The mobile storage unit of claim 7, wherein the monitoring device includes a radio transmitter for transmitting radio location signals.

9. A mobile storage unit comprising:
   a) a substantially rectangular and rigid exo-skeletal frame that frames a storage region that is accessible from an open front and two open sides;
   b) a bag with a main storage compartment coupled to the rigid exo-skeletal frame and positioned within the storage region;
   c) a top seat portion having a front side and a back side and configured to sit on while the mobile storage unit is in an upright position, wherein the top seat portion is supported by the rigid exo-skeletal frame at the front side and the back side; and
   d) means for stabilizing the mobile storage unit in the upright position.

10. The mobile storage unit of claim 9, further comprising wheels and an extendable handle for rolling the mobile storage unit while the mobile storage is in a tilted position.

11. The mobile storage unit of claim 9, wherein the means for stabilizing the mobile storage unit in the upright position includes retractable kick stand features that extend and retract from the exo-skeletal frame.

12. The mobile storage unit of claim 9, wherein the bag is formed from a flexible fabric material.

13. The mobile storage unit of claim 12, wherein the bag includes a plurality of outside pocket features that are accessible through one or more of the open front and the two open sides of the exo-skeletal frame.

14. The mobile storage unit of claim 9, further comprising a monitoring device for transmitting location signals.

15. The mobile storage unit of claim 14, wherein the monitoring device includes a radio transmitter for transmitting radio location signals.

16. A mobile storage system comprising:
   a) monitoring devices for coupling to mobile storage units and sending location signals; and
   b) means for receiving and processing the location signals and remotely identifying the geographical location of the mobile storage units, wherein the mobile storage units include:
      i) a rigid exo-skeletal frame made from tubes and brackets forming an open storage region;
      ii) a flexible storage bag with a main storage compartment, wherein the flexible storage bag couples to the rigid exo-skeletal frame while positioned within the open storage region; and
      iii) a top seat portion having a front side and a back side and configured to sit on while the mobile storage unit is in an upright position, wherein the top seat portion is supported by the rigid exo-skeletal frame at the front side and the back side.

17. The mobile storage system of claim 16, wherein each of the monitoring devices includes a cellular phone device.

18. The mobile storage system of claim 17, further comprising a graphical user interface for displaying the geographical locations of each of the mobile storage units.

19. The mobile storage system of claim 16, wherein each of the monitoring devices includes a GPS device.

20. A mobile storage unit comprising:
   a) a rigid frame;
   b) a flexible storage bag coupled to the rigid frame;
   c) a first pair of wheels coupled at or near a base portion of the rigid frame structure for rolling the mobile storage unit while tilting the mobile storage unit backwards; and
   d) one or more retractable support structures, wherein the retractable support structures provide support to the mobile storage unit when the mobile storage unit is in the upright position such that the mobile storage unit is prevented from tilting on the first pair of wheels, and further wherein, when retracted, the retractable support structures are positioned within wheel wells of the first pair of wheels.

21. A mobile storage unit comprising:
   a) a rigid exo-skeletal frame made from tubes and brackets, wherein the rigid exo-skeletal frame forms an open storage region;
   b) a flexible storage bag with a main storage compartment and that couples to the rigid exo-skeletal frame while positioned within the open storage region;
   c) a top seat portion having a back side and configured to sit on while the mobile storage unit is in an upright position; and
   d) an extendable handle having an extending portion and a gripping portion, wherein the gripping portion is substantially straight such that the entirety of the gripping portion is directly adjacent to the back side of the top seat portion when retracted.

22. A mobile storage unit comprising:
   a) a rigid exo-skeletal frame made from tubes and brackets, wherein the rigid exo-skeletal frame forms an open storage region;
   b) a flexible storage bag with a main storage compartment and that couples to the rigid exo-skeletal frame while positioned within the open storage region;

c) a top seat portion configured to sit on while the mobile storage unit is in an upright position;
wherein the top seat portion extends the width of the top of exo-skeletal frame from a first side of the top of the frame to a second side of the top of the frame that is opposite the first side; and
d) an extendable handle that is aligned with the back side of the top seat portion when retracted.

* * * * *